Figure 1:
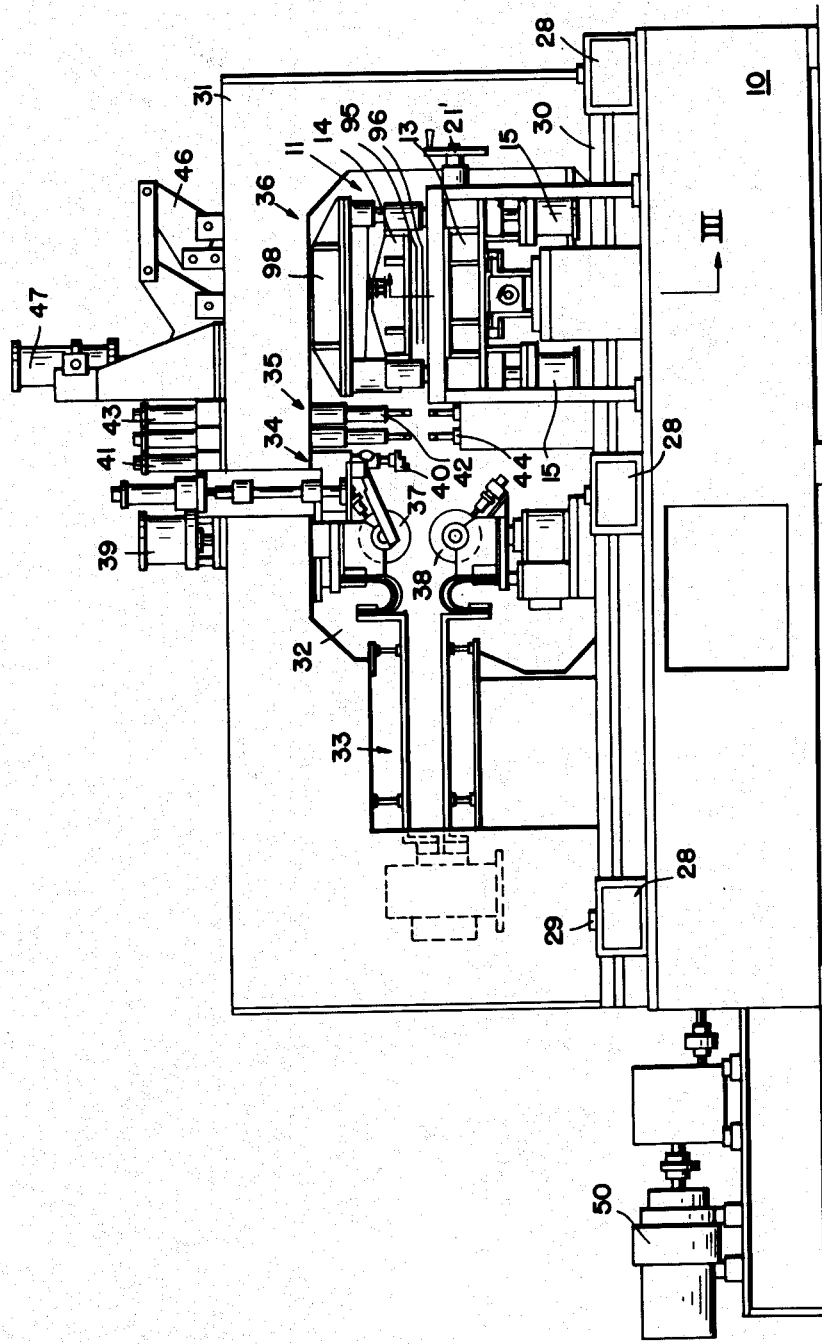

Feb. 13, 1962 J. E. MALLETT ET AL 3,021,416
APPARATUS FOR WELDING STRIP
Filed Nov. 6, 1959 3 Sheets-Sheet 1

INVENTORS
JOHN E. MALLETT
JOSEPH H. COOPER
BY *Francis J. Klempay*
ATTORNEY

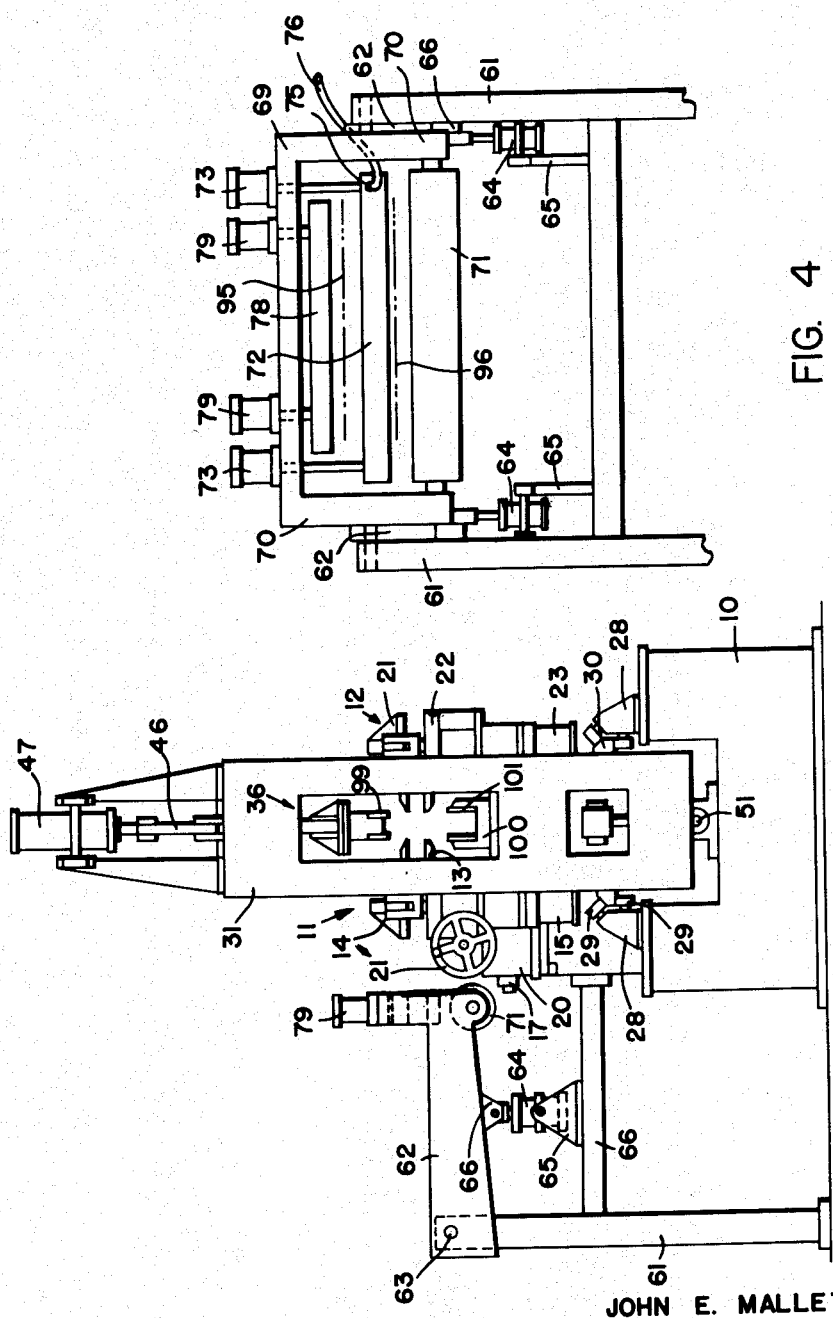

Feb. 13, 1962   J. E. MALLETT ET AL   3,021,416
APPARATUS FOR WELDING STRIP
Filed Nov. 6, 1959   3 Sheets-Sheet 3
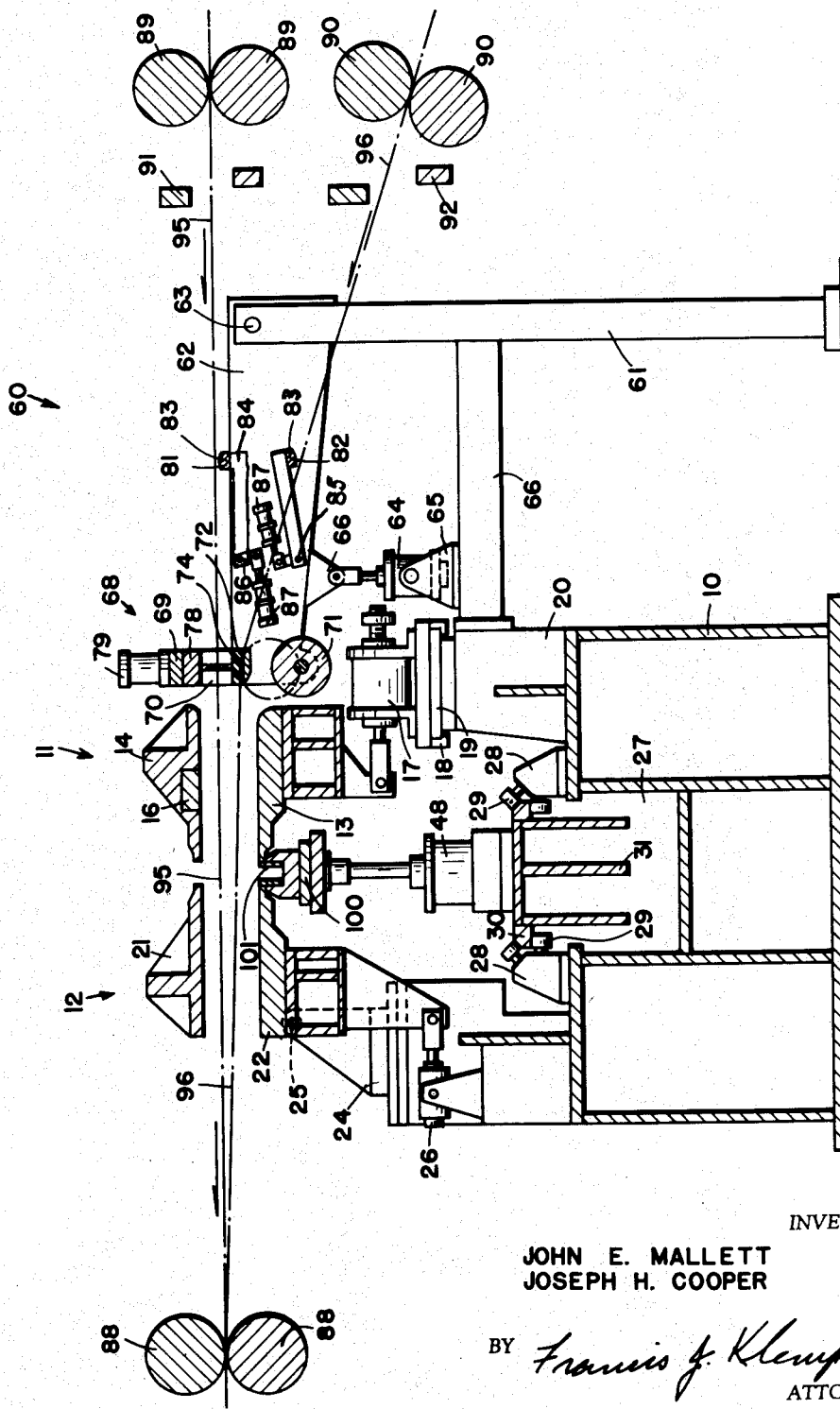
INVENTORS
JOHN E. MALLETT
JOSEPH H. COOPER
BY Francis J. Klempay
ATTORNEY

United States Patent Office 3,021,416
Patented Feb. 13, 1962

3,021,416
APPARATUS FOR WELDING STRIP
John E. Mallett, Chagrin Falls, and Joseph H. Cooper, Warren, Ohio, assignors to The Taylor-Winfield Corporation, Warren, Ohio, a corporation of Ohio
Filed Nov. 6, 1959, Ser. No. 851,287
16 Claims. (Cl. 219—82)

The present invention relates generally to the welding art and more particularly to the provision of highly improved welding apparatus for joining the adjacent ends of metal strips or the like in end-to-end relation. As will be understood by those skilled in the art, it is the common practice to employ a strip welder in a continuous strip processing line. Metal strip is fed into the line from large coils thereof and it is the function of the strip welder to join the leading and trailing ends of successive coils of strip to provide a continuous length of the metal strip. It is, of course, desirable to join the ends of the coils in an acceptable and efficient manner in a minimum of time since the processing line is operating continuously. Successful welding is predicated upon the ability of the strip welder to properly clamp, shear and position the adjacent ends of the strips prior to actual welding operations. Such preparatory operations have heretofore consumed an appreciable amount of the total time required to weld the adjacent ends of the strips.

It is the primary or ultimate object of the present invention to provide apparatus for welding strip which is characterized by its ability to join the adjacent ends of strips in a minimum of time while yet providing completely acceptable welds.

Another object of the invention is to provide a strip welder embodying means for partially preparing and positioning the leading end of a subsequent strip while the preceding strip is passing through the continuous processing line. The above apparatus, which will be hereinafter more fully disclosed, substantially reduces the time required to join the adjacent ends of strips.

Many continuous processing lines comprise apparatus, such as spring-biased rollers, which are sensitive to the thickness of the weld between the strip ends. Various narrow lap or semi-mash electric resistance welding methods have been proposed wherein the resultant weld is of less thickness than the aggregate thickness of the two strip ends. In many installations it is desirable to reduce the thickness of the weld even further. It is therefore a further object of the invention to provide apparatus for welding strip wherein the weld is further reduced in thickness by annealing means and peening means after actual welding operations have been completed.

A still further object of the invention is to provide apparatus for welding strip having the characteristics described above which is of simple and inexpensive construction and which is adapted to be operated in a fast and efficient manner.

The above, as well as other objects and advantages, will become more readily apparent upon consideration of the following specification and accompanying drawing wherein there is disclosed a preferred embodiment of the invention.

In the drawing:
FIGURE 1 is a horizontal end view of apparatus for welding strip constructed in accordance with the teachings of this invention;
FIGURE 2 is a side view of the apparatus shown in FIGURE 1;
FIGURE 3 is a side sectional view taken along the section line III—III of FIGURE 1; and
FIGURE 4 is an end view showing specifically a portion of the means employed for preparing and positioning the leading end of a succeeding strip.

Referring now to the drawing, there is shown a strip welder comprising a generally U-shaped and transversely extending base 10 which supports in longitudinally spaced relation at the forward end thereof a pair of clamping assemblies 11 and 12. The entry side clamping assembly 11 comprises a lower clamping platen 13 and an upper clamping platen 14 which extend transversely across the normal path of strip travel on opposite sides thereof and these platens are adapted to clamp the strip therebetween upon proper actuation of entry side fluid clamping cylinders 15. The upper clamping platen 14 has a transversely extending recess in the lower face thereof which nestingly mounts a magnet 16 therein for purposes to be hereinafter more fully explained. A fluid slide cylinder 17 carries the upper and lower clamping platens 13 and 14 whereby the same may be moved longitudinally to a limited extent. The slide cylinder 17 is carried by a transversely extending channel-shaped slide 18 that cooperates with a transversely extending guide element 19 mounted by a pedestal 20 from the U-shaped base 10. The arrangement is such that the entry side clamping assembly 11 can be adjusted transversely with respect to the exit side clamping assembly 12 upon proper manipulation of a hand wheel 21' to transversely align strip ends clamped thereby. Of course, means other than the hand wheel 21', such as a fluid cylinder, for example, can be employed to transversely adjust the entry side clamping assembly to align the strip ends.

The exit side clamping assembly 12 comprises transversely extending upper and lower clamping platens 21 and 22, respectively, which are adapted to clamp a trailing strip end therebetween upon proper energization of exit side clamping cylinders 23. The exit side clamping platens 21 and 22 are pivotally mounted from the U-shaped base 10 by a pair of brackets 24 and pivot pins 25. A fluid pivot cylinder 26 is drivingly connected with the exit side clamping platens 21 and 22 for pivoting the same vertically.

The U-shaped base 10 defines a generally transversely extending and upwardly opening recess 27 whose upper edges are lined with a plurality of transversely spaced pairs of anti-friction roller assemblies 28. Each of the roller assemblies 28 comprises a pair of angularly related anti-friction rollers 29 which engage the angled bearing surfaces of a slide plate 30. The slide plate 30 forms a portion of a large and transversely movable carriage 31 which is generally rectangular in end elevation and has a large center window 32 therein. Mounted within the window 32 in transversely aligned side-by-side relation are welding means 33, annealing means 34, peening means 35 and shearing means 36.

The welding means 35 is of conventional construction and comprises a pair of current conductive electrode wheels 37 and 38 which are adapted to engage and roll relatively across the properly prepared and positioned strip ends. Suitable electrical means, not particularly shown, are provided for supplying welding current to the electrode wheels 37 and 38 and the upper electrode wheel 37 is vertically movable by a fluid welding cylinder 39. As is conventional, the fluid welding cylinder 39 is of such a size and capacity that it may supply sufficient force to the electrode wheels for fusing the heated strip ends.

The annealing means 34 comprises an annealing torch 40 that is adapted to be supplied with acetylene and oxygen or other heating gases in proper proportions from sources thereof, not shown. The annealing torch 40 is vertically movable by a fluid annealing cylinder 41. The use and function of the annealing means 34 will be hereinafter more fully explained.

The peening means 35 comprises a pair of transversely aligned and vertically reciprocable peening tools 42 which are individually vertically retractable by means of fluid peening cylinders 43. Each of the peening tools 42 is adapted to cooperate with a peening anvil 44 disposed below the normal path of strip travel. The peening means is operative to subject the weld to a continuous and progressive impacting as the carriage 31 is moved transversely with respect to the normal path of strip travel. For those desiring a more detailed description of the construction and operation of such peening means reference should be had to the co-pending application of Roy W. Pearson, Serial No. 743,118, filed June 19, 1958, which is assigned to the assignee of the present invention.

The shearing means 36 comprises an upper shear carrier 98 mounting a pair of longitudinally spaced and transversely extending shear blades 99 and a lower shear carrier 100 which also mounts a pair of longitudinally spaced and transversely extending shear blades 101. The upper shear carrier 98 is mounted for cyclic vertical shearing movement by linkage 46 upon proper actuation of a fluid shearing cylinder 47. The lower shear carrier 100 is vertically movable by a fluid lifting cylinder 48 whereby the lower shear carrier may be retracted from the position shown in FIGURE 3 to allow relative longitudinal movement of the clamping assemblies 11 and 12. The shearing means 36 is preferably constructed in accordance with the teachings of the co-pending application of Joseph H. Cooper and Melvin M. Seeloff, Serial No. 732,596, filed May 2, 1958, which is assigned to the assignee of the present invention, now Patent No. 2,957,071, dated October 18, 1960.

The carriage 31 is movable transversely with respect to the normal path of strip travel by means of a drive motor 50 operating through suitable speed reducing means and a shaft 51 which is threadably received in the carriage 31. The arrangement is such that upon proper energization of the drive motor 50 the carriage 31, along with the welding means, annealing means, peening means and shearing means, will be moved transversely with respect to the normal path of strip travel.

Disposed on the entry side of the movable carriage 31 and immediately to the rear of the entry side clamping assembly 11 is the means for partially preparing and positioning the leading end of a succeeding strip. Such means is designated generally by the reference numeral 60 and comprises a pair of vertically extending supports 61 which pivotally mount transversely spaced and longitudinally extending side plates 62. The side plates 62 are pivoted to the supports 61 by pivot pins 63 and these side plates are adapted to be moved in a vertical direction upon proper actuation of a pair of fluid pivot cylinders 64. Each of the fluid pivot cylinders 64 is mounted between a clevis 65 attached to a horizontal structural member 66 that extends between the pedestal 20 and one of the supports 61 while its piston rod is connected to a link 66 extending downwardly from one of the side plates 62. The side plates 62, as well as all other apparatus carried thereby, may be pivoted vertically upon proper energization of the fluid pivot cylinders 64.

Disposed at the forward end of the side members 62 is a deflector clamping assembly 68 which comprises a U-shaped mounting member 69 having a pair of transversely spaced and downwardly depending elongated arms 70. The U-shaped mounting member 69 spans the side plate 62 and journaled at the extreme lower ends of the arms 70 is a transversely extending lower strip clamping and supporting roll 71. Disposed above the lower strip clamping and supporting roll 71 is an intermediate clamping member 72 whose ends are connected to the piston rods of a pair of intermediate clamping cylinders 73. The intermediate clamping cylinders 73 are mounted at the ends of the mounting member whereby the intermediate clamping member 72 may be lowered into tight clamping relation with respect to the lower strip supporting and clamping roll 71.

The intermediate clamping member 72 is suitably bored or otherwise machined to provide the same with internal passageways 74 which terminate in ports on the upper surface thereof. The passageways 74 are connected through a suitable coupling 75 at one side of the intermediate clamping member to a flexible conduit 76 which in turn leads to a source of compressed air, not shown. When compressed air is supplied to the passageways 74 there is a vertical air blast across the entire width of the intermediate clamping member 72. Of course, suitable valve means, also not shown, may be provided in the flexible conduit 76 for controlling the amount and time of application of the air supplied to the passageways 74. The utility of the above structure will be hereinafter more fully explained.

Disposed above the intermediate clamping member 72 is an upper strip clamping member 78 whose ends are connected to the piston rods of a pair of upper clamping cylinders 79. The upper clamping cylinders 79 are mounted on the top surface of the U-shaped mounting member 69 and it will be noted that one of the upper clamping cylinders 79 and one of the intermediate clamping cylinders 73 are disposed adjacent each side of the U-shaped mounting member 69. Upon proper actuation of the upper clamping cylinders 79 the upper clamping member 78 may be lowered into tight clamping relation with respect to the top surface of the intermediate clamping member 72. The lower clamping and supporting roll 71, the intermediate clamping member 72 and the upper clamping member 78 are all vertically aligned and extend transversely across the normal path of strip travel. Also, the entire deflector clamping assembly 68 is carried by the side members 62 whereby this clamping assembly is moved vertically upon actuation of the pivot cylinders 64.

Disposed rearwardly of the deflector clamping assembly 68 and mounted between the side members 62 are upper and lower strip retractors 81 and 82, respectively. Each of the strip retractors comprises a transversely extending retractor bar 83 which is joined at its ends to transversely spaced generally L-shaped arms 84. The L-shaped arms 84 are spanned and connected at their forward ends by a transversely extending pivot shaft 85 which spans the side member 62. A link 86 is attached to the pivot shaft 85 and this link is drivingly connected to the piston rod of a fluid retractor cylinder 87 which is mounted on one of the side members 62. The disclosed arrangement is such that when the upper retractor cylinder 87 is energized the upper retractor bar 83 will be pivoted upwardly from the position shown while when the lower retractor cylinder 87 is actuated the lower retractor bar 83 will be pivoted downwardly into its extended position.

In addition to the apparatus above described, ancillary strip handling facilities are employed with the strip welder. In the illustrated embodiment of the invention this is shown to comprise a pair of driven exit side pinch rolls 88 disposed forwardly of the exit side clamping assembly 12 for pulling the strip through the welder. On the entry side of the welder two pairs of driven entry side pinch rolls 89 and 90 are utilized for moving strip into the welding apparatus. The pairs of entry side pinch rolls 89 and 90 are disposed vertically with respect to each other as shown. Positioned in front of the upper entry side pinch rolls 89 is an upper external shear comprising the vertically movable shear blades 91. A similar lower external shear comprising shear blades 92 is disposed in front of the lower entry side pinch rolls 90. Further, if the strip is supplied in coils, vertically disposed upper and lower reels for receiving the coils and paying-off the strip would be provided.

Referring to FIGURE 3 of the drawing, it will be observed that the above described apparatus defines a pair of vertically disposed pass lines for the strip which converge at the exit side pinch rolls 88. The upper pass line, designated by the numeral 95, extends through the upper entry side upper pinch rolls 89, through the upper external shear 91, across the upper retractor bar 83, through the deflector clamping assembly 68 between the intermediate clamping member 72 and the upper clamping member 78, through the entry side clamping assembly 11 and through the exit side clamping assembly 12 to the exit side pinch rolls 88. The lower pass line 96 is positioned vertically below the upper pass line 95 and extends through the lower entry side pinch rolls 90, through the lower external shear 92, below the lower retractor bar 83, through the deflector clamping assembly 68 between the lower supporting and clamping roll 71 and the intermediate clamping member 72, through the entry side clamping assembly 11 and through the exit side clamping assembly 12 to the exit side pinch roll 88.

*Operation*

Considering now the operation of the apparatus described above, it will be assumed that initially the large rectangular carriage 31 is positioned as shown in FIGURE 1 of the drawing with the various welding means 33, annealing means 34, peening means 35 and shearing means 36 being completely open. It will also be assumed that initially the clamping assemblies 11, 12 and 68 are completely open and that strip is passing through the strip welder along the lower pass line 96. At this time the supporting and clamping roll 71 of the deflector clamping assembly 68 is disposed in the position indicated by the broken lines in FIGURE 3 of the drawing for supporting the strip passing along the lower line 96.

With the strip from a lower coil thereof passing along the lower pass line 96 the leading end of an upper coil of metal strip is fed through the upper entry side pinch rolls 89 and is cropped by the upper external shear 91. Then the leading end of the upper strip is jogged forward by the upper entry side pinch rolls 89 through the deflector clamp assembly 68 between the upper clamping member 78 and the intermediate clamping member 72 until the leading end of the upper strip is positioned slightly in advance of the forward edges of the clamping platens 14 and 13 comprising the entry side clamping assembly 11. As the leading end of the upper strip is moved into the deflecting clamp assembly 68 the flexible conduit 76 is connected to a source of air under pressure whereby the passageways 74 in the intermediate clamping member 72 supply an upwardly directed air blast which extends transversely across the upper pass line 95. The effect of this air blast is to maintain the leading end of the upper strip out of interfering contact with the lower strip passing through the shear welder. As the leading end of the upper strip continues to move forward it is engaged and supported in elevated position by the transversely extending magnet 16. Both the air blast from the passageways 74 and the magnet 16 retain the upper strip above the lower strip while the leading end thereof is moving into its final position but thereafter the air blast is discontinued and the magnet 16 is of sufficient strength to maintain the upper strip in contact with the upper clamping platen 14 of the entry side clamping assembly 11.

The upper clamping cylinders 79 are now actuated to move the upper clamping member 78 downwardly into tight clamping relation with the upper strip and the intermediate clamping member 72. Then, to provide sufficient slack for further operations, the upper entry side pinch rolls 89 feed a short length of the upper strip forward to cause a slight bow therein. At this point the leading end of the upper strip has been partially prepared and positioned for subsequent welding operations while yet the lower strip is continuously moving through the strip welder in a free and unobstructed manner.

When the lower strip approaches the end of the coil, it is stopped in the strip welder and is firmly clamped by the exit side clamping assembly 12. It should be understood that the lower strip will extend at this time back through the lower entry side pinch rolls 90. With the exit side clamping assembly 12 firmly clamping the lower strip the deflector clamping assembly 68—having the leading end of the upper strip firmly clamped between the upper clamping member 78 and the intermediate clamping member 72 as previously described—is pivoted downward thereby lowering the upper strip until the leading end of the upper strip and the lower strip are disposed in flat overlying relation on the lower welding platen 13 of the entry side clamping assembly 11. Simultaneously with the downward movement of the deflector clamping assembly 68 the upper clamping platen 14 of the entry side clamping assembly 11 may be lowered whereby the upper and lower strips are firmly clamped in flat overlying relation between the clamping platens 13 and 14. The flat overlying relation between the upper and lower strips is particularly important in order that the leading end of the upper strip does not shift with respect to the entry side clamping assembly 11 during the remainder of the strip welding operation.

The lower shear carrier 100 has been previously raised into the position shown in FIGURE 3 of the drawing and the shearing cylinder 46 is properly energized to move the upper shear carrier 98 and shear blades 99 through a shearing cycle. This shears the leading end of the upper strip and the lower strip and provides a trailing strip end projecting rearwardly from the exit side clamping assembly 12. It will be noted that at this time the upper strip is clamped by the deflector clamping assembly 68 and may also be clamped by the entry side clamping assembly 11. Prior to shearing the lower strip is clamped at longitudinally spaced points by the clamping assemblies 11 and 12 providing, of course, that the upper clamping platen 14 of the entry side clamping assembly 11 has been lowered. When the shearing operation is completed the entry side clamping assembly 11 is opened momentarily while the leading strip end is still clamped by the deflector clamping assembly 68 and the lower retractor cylinder 87 is actuated to move the lower retractor bar 83 downwardly whereby this retractor bar engages the scrap end of the lower strip and retracts the same rearwardly for a predetermined distance. The arrangement is such that the scrap end of the lower strip is quickly pulled away from the front edges of the entry side clamping assembly 11 whereby the same does not interfere with the making of the weld. Even though the leading end of the upper strip and the scrap end of the lower strip are disposed in overlying relation the scrap end may be retracted without effecting the positioning of the leading end of the upper strip since the upper strip is rigidly clamped between the upper clamping member 78 and the intermediate clamping member 72 of the deflector clamping assembly 68 while the scrap end of the lower strip is free.

After retraction of the scrap end the upper clamping platen of the entry side clamping assembly 11 is lowered to firmly clamp the leading strip end of the upper strip. The clamping cylinders 79 are then actuated to raise the upper clamping member 78 whereby the leading strip end is released from the deflector clamping assembly 68.

The exit clamping assembly 12 is now pivoted upwardly upon actuation of a pivot cylinder 26 to avoid interference between the trailing and leading strip ends and the entry side clamping assembly 11 is moved longitudinally upon energization of the cylinder 17 to close the shear gap and overlap the strip ends. Of course, the lower shear carrier 100 has been previously retracted to allow the relative movement and overlapping of the strip ends.

After overlapping of the strip ends the drive motor 50 for the carriage 31 is energized to move the carriage transversely to a position where the electrode wheels 37 and 38 are disposed on the opposite side of the normal path of strip from that shown in FIGURE 1 of the drawing. The carriage 31 may be moved into this position during overlapping of the strip ends if the various means carried thereby are so vertically disposed that they do not interfere with the overlapping. The drive motor 50 is now reversely actuated to move the carriage 31 back toward its original position. As the electrode wheels 37 and 38 engage the overlapped strip ends weld current is supplied thereto to soften the strip ends and sufficient force is exerted by the welding cylinder 39 to fuse the softened strip end. There is thus provided a continuous strong weld of less thickness than the additive thickness of the two strip ends.

As the carriage 31 is moved back to its original position the annealing means 34 and the peening means 35 follow the welding means across the then welded strips. The annealing torch 40 is operative to direct an annealing flame against the weld to anneal and soften the same. This softening of the weld allows the impacting or hammering of the impacting tools 42 to be more effective in reducing the thickness of the weld. It will be noted that the annealing means follows directly behind the welding means whereby the annealing flame move transversely across the welded strips as the welding carriage is returned to its original position. Of course, the annealing torch 40 may be retracted upon proper energization of the annealing cylinder 41. The use of the annealing means is especially desirable when welding high carbon steel strips or the like but the same is not absolutely necessary when welding low carbon steel strips.

The peening means subject the weld to a very strong progressive impacting or hammering as the peening tools 42 repeatedly strike the softened weld. This hammering or impacting by the peening tools is operative to further reduce the thickness of the weld so that the same may pass free through other processing apparatus. The peening is not always necessary since the welds do not have to be further reduced in thickness in some instances.

As soon as the carriage 31 has been returned to its initial position all other various means carried thereby are completely opened and the entry and exit side clamping assemblies 11 and 12 are opened so that the welded strip may pass through the strip welder along the upper pass line 95. After the welded strip is moving along the upper pass line the scrap end of the lower strip is removed by reversing the direction of rotation of the lower entry side pinch rolls. The deflector clamping assembly 68 is positioned as shown in FIGURE 3 of the drawing to allow clearance of the moving strip between the upper clamping member 78 and the intermediate clamping member 72.

The leading end of a lower strip may now be fed into the lower entry side pinch rolls 90 and then jogged forward so that the leading end thereof may be cropped by the lower external shear 92. After cropping the leading strip end of the lower strip is jogged forward and through the deflector clamp assembly 68 between the lower supporting and clamping roll 71 and the intermediate clamping member 72 until the extreme forward edge thereof projects slightly beyond the forward edge of the entry side clamping assembly 11. It will be noted that it is not necessary to provide magnetic or air blast means for maintaining the leading end of the lower strip out of interfering relation with respect to the upper strip since the weight of the free strip end will accomplish this. However, if desired, such magnetic and air blast means could be incorporated in the upper surface of the lower clamping platen 13 and the lower surface of the intermediate clamping member 72, respectively. When the leading end of the lower strip is so disposed the intermediate clamping member 72 is lowered upon actuation of the clamping cylinders 73 to firmly clamp the lower strip against the periphery of the lower strip supporting and clamping roll 71. When the strip on the upper coil is nearly exhausted it is stopped and the same general sequence as described above is repeated to join the strip ends.

The above described embodiment of the invention discloses apparatus wherein the means for partially preparing and positioning the leading strip ends is disposed on the entry side of the welder. Such means might also be disposed on the exit side of the welder and in this case the direction of strip travel would be opposite to that shown in the drawing. This arrangement could be very advantageously employed in a processing line wherein coils of strip are continuously inspected and unacceptable sections thereof are cut out and diverted to a scrap coil while the acceptable sections are welded and built up into a prime coil. The various steps in the operational cycle of such apparatus would be essentially the same as for the embodiment described above.

While in the drawing the entry side pinch rolls 89 and 90 and the external shears 91 and 92 are shown disposed in vertically spaced relation it should be understood that this arrangement of the ancillary strip handling apparatus is not intended to limit the present invention since other apparatus could be employed. For example, it may be desirable to provide a single vertically movable external shear for cropping the leading ends of both strips. Further, the arrangement for directing jets of compressed air from the intermediate clamping member 72 to support the upper strip in elevated relation with respect to the lower strip could be replaced by a plurality of ports in the upper clamping member 78 that would be connected to a source of suction. Also, the retractor assemblies may be mounted separately from the deflector clamping assembly 68 and the lower clamping and strip supporting roll 71 might be replaced with a lower clamping plate and a stationarily mounted supporting roll. This latter element would be disposed between the deflector clamping assembly and the entry side clamping assembly. It is also contemplated that in many cases the deflector clamping assembly 68 will be mounted separately from the retractor assemblies and a strip supporting roll from the same transverse slide (designated by numerals 18 and 18 in the drawing) which mounts the entry side clamping assembly 11. In this manner both the entry side clamping assembly and the deflector clamping assembly would be transversely movable to allow transverse alignment of the adjacent strip ends.

It should be apparent that the objects initially set forth have been accomplished. There has been disclosed new and novel means for partially preparing and positioning the leading end of a subsequent coil of strip while the preceding coil of strip is being payed-off in a continuous and free manner. Also, we have disclosed the use of annealing means which, in combination with the peening means, is operative to further reduce the thickness of the weld.

Many changes may be made in the illustrated embodiment of the invention without departing from the clear teachings thereof. Accordingly, reference should be had to the following appended claims in determining the true scope and intent of the invention.

We claim:

1. Strip welding apparatus for welding the adjacent ends of metal strips which comprises a pair of spaced clamping assemblies mounted in the normal path of strip travel, transversely movable welding means, means to move said welding means transversely of said normal path of strip travel between said clamping assemblies to weld said adjacent ends of metal strips, a deflector clamping assembly, said deflector clamping assembly being positioned adjacent one of said clamping assemblies in said normal path of strip travel, said deflector clamping assembly comprising means to clamp a first metal strip passing along a first pass line, means to clamp a second metal strip passing along a second pass line, and said first pass line being vertically disposed with respect to said second pass line.

2. Apparatus according to claim 1 further characterized in that said means to clamp said first metal strip and said means to clamp said second metal strip comprises an upper clamping member, an intermediate clamping member and a lower clamping member, means to move said upper clamping member into clamping relation with said intermediate clamping member, and means to move said intermediate clamping member into clamping relation with said lower clamping member.

3. Apparatus according to claim 1 further comprising means to vertically move said means to clamp said first metal strip and said means to clamp said second metal strip en masse.

4. Apparatus according to claim 1 further comprising means to support said first metal strip in vertical disposed relation with respect to said second metal strip, and said means to support comprising a vertically directed air blast.

5. Apparatus according to claim 1 further comprising means to support said first metal strip in vertical disposed relation with respect to said second metal strip, and said means to support comprising a magnet extending across said first pass line.

6. Apparatus according to claim 1 further comprising retractor means associated with each of said pass lines, each of said retractor means comprising a retractor bar extending transversely of the pass line associated therewith, and means to move each of said retractor bars vertically through said pass line associated therewith to retract the metal strip associated therewith.

7. A deflector clamping assembly for strip welding apparatus comprising a first clamping means for clamping a first metal strip passing along a first pass line, second clamping means for clamping a second strip passing along a second pass line, and said second pass line being vertically disposed with respect to said first pass line.

8. Apparatus according to claim 7 further characterized in that said first clamping means comprises a lower clamping member and an intermediate clamping member, said second clamping means comprising an upper clamping member and said intermediate clamping member, means to move said upper clamping member into clamping relation with said intermediate clamping member, and means to move said intermediate clamping member into clamping relation with said lower clamping member.

9. Apparatus according to claim 8 further characterized in that said clamping assembly comprises a roll, means to vertically move said first and said second clamping means, and said roll being positioned to support metal strip passing along said first pass line.

10. Apparatus according to claim 8 further comprising means to support said second metal strip in vertically disposed relation with respect to said first metal strip when said first and said second clamping means are open, said means to support comprising a plurality of passageways in at least one of said clamping members, said passageways terminating in vertically directed ports, and means to supply a fluid to said passageways.

11. A deflector clamping assembly for strip welding apparatus comprising a first clamping means for clamping a first metal strip passing along a first pass line, second clamping means for clamping a second metal strip passing along a second pass line, said first pass line being vertically disposed with respect to said second pass line, retractor means associated with each of said pass lines, each of said retractor means comprising a retractor bar extending transversely with respect to the pass line associated therewith, and means to vertically move each of said retractor bars through the pass line associated therewith to retract the metal strip disposed therealong.

12. A deflector clamping assembly comprising a pair of transversely spaced side plates, a mounting member carried by said side plates and spanning the normal path of strip travel, a transversely extending lower clamping member mounted from said mounting member, a transversely extending intermediate clamping member disposed vertically of said lower clamping member and mounted from said mounting member, a transversely extending upper clamping member disposed vertically of said intermediate clamping member and being mounted from said mounting member, means mounted on said mounting member for effecting relative vertical movement between said clamping members, and means to vertically move said mounting member.

13. Strip welding apparatus for welding the adjacent ends of metal strips which comprises a pair of spaced clamping assemblies mounted in the normal path of strip travel, transversely movable welding means, means to move said welding means transversely of said normal path of strip travel between said clamping assemblies, a deflector clamping assembly, said deflector clamping assembly being positioned adjacent one of said spaced clamping assemblies in said normal path of strip travel, and means to move said one of said spaced clamping assemblies and said deflector clamping assembly transversely of said normal path of strip travel.

14. Stock loading means for strip joining apparatus of the kind having a pair of strip clamping assemblies spaced longitudinally along the line of travel of the strip through the apparatus and also having a welding assembly movable transversely of said path between said clamping assemblies to weld together end portions of successive lengths of strip comprising means to feed and guide successive strip lengths for longitudinal movement through said apparatus from a pair of vertically spaced strip length sources positioned at the entry end of said apparatus whereby upon the paying out of a first strip length from one of said sources the leading end of a second strip length from the other of said sources may be joined by said apparatus to the tail end of the first length, said loading means having means to position and to retain the leading end portion of the next succeeding or second strip length to be joined in a predetermined location within said apparatus and through one of said clamping assemblies while the preceding or first strip length is moving longitudinally through said apparatus with said clamping assemblies being open, and means to vertically separate the said positioned and retained strip length end portion from the first or moving strip length.

15. The combination of claim 14 further characterized in that said apparatus further includes a retractable shear to shear strip ends located between said clamping assemblies, and said loading means comprising means to withdraw the cropped tail end of the said preceding or first strip length after actuation of said shear and during opening of that strip clamping assembly which is positioned between the shear and the loading means.

16. The combination of claim 14 further including means operable upon stopping of said first or moving strip length to bring the same into contacting overlapped relation with the leading end portion of the second or succeeding strip length.

References Cited in the file of this patent

UNITED STATES PATENTS

| | | |
|---|---|---|
| 499,657 | Coffin | June 13, 1893 |
| 1,205,570 | Sessions | Nov. 21, 1916 |
| 2,047,254 | Burnish | July 14, 1936 |
| 2,369,830 | Johnson et al. | Feb. 20, 1945 |
| 2,412,648 | Rendee | Dec. 17, 1946 |
| 2,800,568 | Cooper | July 23, 1957 |